July 1, 1969  A. S. GAHIR ET AL  3,453,372
JOINTS FOR ELECTRIC CABLES
Filed May 23, 1967
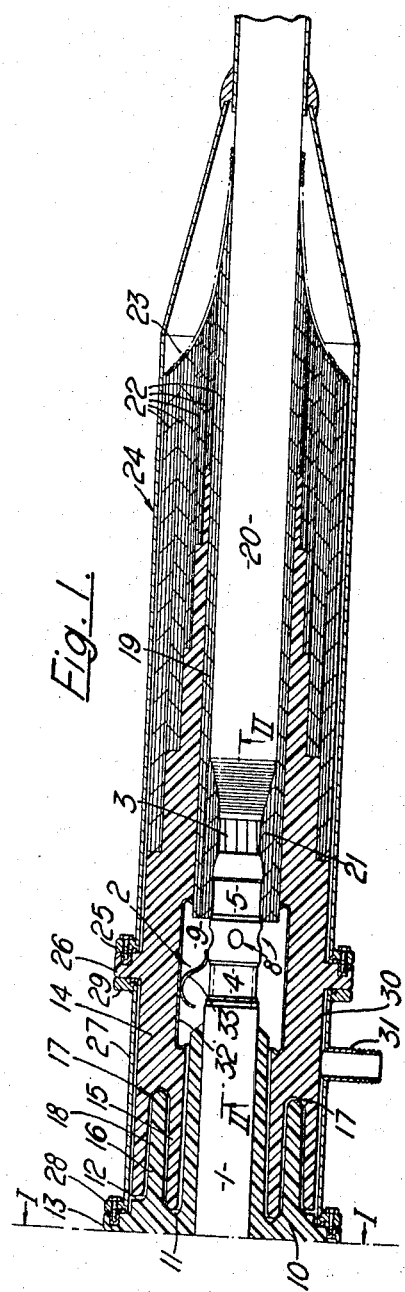
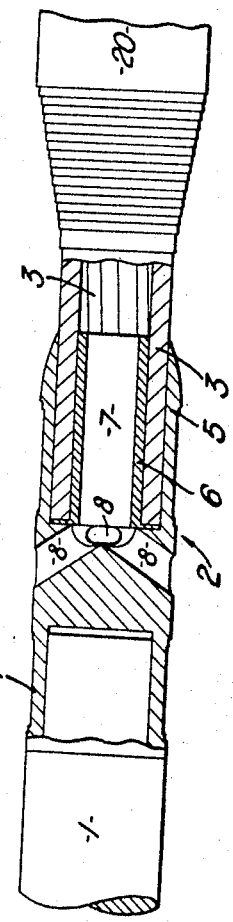
Inventor
AVTAR SINGH GAHIR
MICHAEL SAUVAS PAPADOPULOS
By W.H. Binder
Rohm & Witt  Attorney

3,453,372
JOINTS FOR ELECTRIC CABLES

Avtar Singh Gahir, Kisumu, Kenya, and Michael Savvas Papadopulos, Longfield, England, assignors to British Insulated Callender's Cables Limited, London, England
Filed May 23, 1967, Ser. No. 640,584
Claims priority, application Great Britain, May 25, 1966, 23,295/66
Int. Cl. H02g *15/24*
U.S. Cl. 174—22        17 Claims

ABSTRACT OF THE DISCLOSURE

In a stop joint for a fluid-filled electric power cable, sinuous fluid paths for feeding fluid to and from the conductors are formed on each side of the median plane of the joint between a tubular central preformed body of insulating material and preformed tubular end bodies of insulating material, each intercalated with the central body. The latter body is sealed internally to a connected for the cable conductors and externally to a fluid-tight enclosure for the joint to provide a fluid barrier separating the two halves of the joint. Each of the bodies may have peripheral flanges between which and the cable sheaths, sleeves forming the enclosure are disposed.

---

This invention relates to stop joints for fluid-filled electric cables, that is to say cables in which the dielectric of the cable conductors connected at the joint includes a dielectric fluid, usually oil, which is free to flow along the cable conductor or conductors. The dielectric will usually be a laminated body build-up by lapping tapes of paper or other insulating material onto the cable conductors. A stop joint is a joint which presents a barrier to the flow of the dielectric fluid from one to the other of the two cable lengths electrically connected at the joint. The invention includes the stop joint structures and cable installations incorporating stop joints made therefrom.

The invention is mainly concerned with joints between single core fluid-filled cables and will be described as applied to such joints. It relates to stop joints in which the barrier to the flow of the dielectric fluid comprises a connector, by which the conductors of the two cables are both electrically and mechanically connected, and a preformed body of insulating material which surrounds at least part of and is directly or indirectly sealed to the connector and to a fluid-tight enclosure for the joint.

The connector may for example be a solid or hollow rod adapted to receive at each end a ferrule into which one of the conductors fits or it may itself be a ferrule, into each end of which one of the conductors fits, provided with a central barrier to prevent oil flowing from one conductor to the other.

The preformed body of insulating material surrounding the connector (the "central" body) may for example be vacuum cast from an epoxy resin and it may be sealed directly to the connector or to another body surrounding and sealed to the connector.

In the stop joint in accordance with the invention, each of the joints between the connector and a conductor of the two cables connected at the joint is surrounded by a further preformed body of insulating material and these two additional bodies (hereinafter referred to as the "end" bodies) are each intercalated with one end of the central body in such a way as to provide a sinuous path for the dielectric fluid leading from the region of the conductor joint at the end of the connector radially outwards to the outer part of the joint enclosure.

Each of the three preformed bodies is preferably provided with a peripheral flange and the central part of the fluid-tight joint enclosure preferably comprises two sleeves each extending from one side of the flange on the central body to the flange on one of the end bodies (hereinafter referred to as the "inner sleeves"). The remainder of the fluid-tight enclosure may consist of two end sleeves each extending from the sheath of one of the cable lengths, or a gland sealed thereto, to the opposite side of the flange on one of the end bodies to that connected to the inner sleeve. This preferred construction has the advantage that the inner sleeves of the enclosure, to which inlet or outlet pipes for the dielectric fluid are connected, can readily be electrically isolated by the flanges on the preformed insulating bodies from each other and from the end sleeves of the enclosure which are electrically connected to the cable sheaths. Also the inner sleeves of the enclosure can readily be supported by the flanges in such a way that they are spaced from the preformed bodies so as to provide annular fluid chambers connected by the sinuous fluid paths to the inner part of the joint structure.

Stop joints in accordance with the invention are especially suitable for use in installations in which the cable is cooled by circulating dielectric fluid through the hollow conductor of the cable and through external cooling means, the fluid leaving and reentering the cable at the stop joints.

The invention will be further illustrated by a description by way of example with reference to the accompanying drawing of a stop joint for 400 kv. single core oil-filled cables for use in an installation in which the cable is cooled by the circulation of the oil therethrough and through external cooling means. In the drawings, FIGURE 1 is an elevation in vertical section of one half of the joint and FIGURE 2 is a partial section on line II—II in FIGURE 1.

The two halves of the joint are identical and line I—I in FIGURE 1 represents the median plane between the two halves.

The connector for the conductors of the two cable lengths is in the form of a solid cylindrical metal rod 1 to each end of which is compression jointed a ferrule 2 for receiving the hollow conductor 3 of one of the two cable lengths. The ferrule is a double ended ferule and is compression jointed at 4 to the rod 1 and at 5 to the end of the conductor 3, the end of the conductor being prevented from collapsing under the compressive force by a rigid metal sleeve 6 (FIGURE 2) inserted in the end part of the central duct 7.

The ferrule is provided with four radial passages 8, communicating with the conductor duct 7, through which oil can flow freely from the conductor duct into an annular space 9 around the ends of the rod and ferrule or from such annular space into the conductor duct. It will be noted that the passages are so disposed that the fluid is deflected through an angle less than 90° when flowing from the hollow conductor into the annular space and vice versa.

The middle part of the connector rod fits into and is directly sealed to a closely fitting cylindrical bore in a body 10 (the "central" body) of cast epoxy resin of generally cylindrical shape. A deep annular groove 11 opening in the end face of the central body and an annular recess 12 extend concentrically with the cable axis almost to the median transverse plane I—I of the body 10 (that bisects its longitudinal axis). The body 10 is formed centrally with an integral peripheral flange 13, bisected by the median plane I—I.

The rod 1 forming part of the connector may be embedded in the central preformed body 10 in such a way that there is surface adhesion between the body and the rod, the central body preferably being vacuum cast, for example from an epoxy resin, directly around the rod, leaving the ends of the rod to which the ferrules are compression jointed projecting from the cast body. Other forms of seal may be used, for example the rod may be made a close fit in the body and sealed to it by an O-ring seal or seals.

Each of the conductor joints is surrounded by another cast body (the "end" bodies) of epoxy resin having a larger cylindrical through bore than that of the central body. The end body 14 seen in FIGURE 1 has an end face provided with two concentrically projecting annular fins one of which (15) fits with a small clearance into the concentric groove 11 in the contiguous face of the central body 10 and the other of which (16) fits with a small clearance in the stepped recess 12 in the central body. Circumferentially spaced projections 17 are provided within the clearance spaces to maintain the bodies in alignment without substantially obstructing the flow of oil through the sinuous passage 18 thus formed between the bodies.

The bore of the end body 14 fits onto insulation 19 built up on the end of the cable dielectric 20 and extending over further insulation 21 built up over the conductor joint but this built-up insulation terminates a sufficient distance from the end wall of the central body 14 to leave the radial oil passages 8 in the connector unobstructed and to form a boundary of the annular oil chamber 9 around the outlets of these passages, which chamber is in communication with the inner opening of the sinuous oil passage 18 between the bodies.

The end of the end body 14 remote from the central body 10 extending over the cable dielectric 20 tapers in steps to receive bodies 22 of insulation built up in situ and shaped to form a stress cone, that is a conoidal end part carrying a conductive layer of lead wire 23 on its outer surface connected in the normal way to the dielectric screen or sheath of the cable.

The built-up insulation referred to may be made partly or wholly of directly applied lappings of paper or other insulating tapes or partly or wholly from preformed bodies made from tapes and/or other insulating material, for example precast bodies.

The fluid-tight enclosure for the joint is made from four flanged metal sleeves and comprises two inner sleeves and two end sleeves. The end sleeve 24 seen in FIGURE 1 tapers down at one end to the diameter of the cable sheath, to which the end of the sleeve is plumbed in the normal manner, and the sleeve is provided with a flange 25 at the other end that is bolted in a fluid-tight manner to an integral flange 26 on the end preformed body 14 of insulating material, which it partially encloses. The inner sleese 27 is of uniform diameter and is provided with flanges 28 and 29 to enable it to be bolted in a fluid-tight manner between the flange 26 on the end body and the flange 13 on the central performed insulating body. The bolts by which the flanges of the inner and end sleeves are attached to the flanges 13 and 26 engage threaded inserts in the flanges, the inserts on one face of each flange being staggered from those on the other face in such a way that the sleeves are insulated from each other by the flanges.

The inner sleeve 27 is spaced from the parts of the central and end preformed bodies which it surrounds to leave an annular oil chamber 30 communicating with the sinuous passage 18 and this chamber is provided with an inlet or outlet pipe 31 for oil circulation, mounted in the central sleeve 27.

Because of the large radial depth of the annular oil filled space necessarily left between the ferrule and the bore of the end body and in view of the possibility that the electrical stress field will be distorted by the discontinuity of the ferrule within the bore, around the outlets for the oil passages, we prefer to provide a screen at conductor potential in this part of the bore. The screen may either be embedded in the end body or applied to its surface. In the example described with reference to the drawing a conductor screen 32 connected by a spring contact 33 to the ferrule 4 is applied to the wall of an annular recess in the end body 14. The screen may be a metallised coating appropriately treated to make it resistant to erosion by the flow of oil over its surface or a shell of resin made electrically conductive by the incorporation of a metallic or nonmetallic filler.

Instead of a parallel bore sleeve, such as the sleeve 6, a shaped sleeve which has a smooth through-bore converging from each end of the insert to a part of a minimum internal diameter can be used. In this case the passages extending from the end of the sleeve to the peripheral surface of the ferrule are inclined at an acute angle to the ferrule axis such that, in cooperation with the bore of the insert, a smooth passage is provided for fluid flow from the hollow conductor to the annular chamber around the ferrule or vice versa; the end of the sleeve which is remote from the end of the cable conductor preferably has an internal diameter equal to, or approximately equal to, the internal diameter of the hollow conductor. Such a shaped sleeve produces a Venturi effect on the flow of fluid and ensures that flow of fluid is not impeded by any sudden changes in bore diameter at or near the end of the hollow conductor. The inclined passages in the ferrule also ensure that fluid flow is not impeded by any sudden changes in the direction of the path of the fluid and the converging parts of the bore of the insert are preferably smooth curves of convex form.

A further alternative ferrule, especially suitable for hollow conductors consisting of a single layer of segmental conductor elements, is a tubular ferrule with a central transverse barrier from one side of which an integral cylindrical plug projects along the axis of the ferrule coextensively with the outer part of the ferrule on that side of the barrier. The plug is of sufficiently greater cross-sectional area than the space within the conductor to cause at least some and preferably all of the conductor elements to spread apart from each other, in the region of the connection, to an extent sufficient to provide a number of passages between the elements of an aggregate area sufficient to allow the required flow of fluid to or from the hollow conductor. The radial thickness of the annular space between the plug and the ferrule is just sufficient to receive the spaced conductor elements and they are secured to the plug by compressing the overlying part of the ferrule by dies of the kind normally used to make a compression joint. The extreme end of this part of the ferrule is preferably tapered to provide a smooth profile where the conductor enters the ferrule. The part of the ferrule on the opposite side of the barrier can be compression jointed directly to a metal rod-forming a connector for jointing the conductor to another similar conductor as in the example described with reference to the drawing, the other conductor being connected in the same way to the other end of the rod. Owing to the smooth configuration of the conductor and ferrule and owing to the fact that with an even distribution of the oil flow around the ferrule the radial depth of the annular oil chamber can be made smaller, the use of a conductor screen can be avoided. This ferrule is the subject of copending U.S. patent application Ser. No. 640,694, filed May 23, 1967, of M. S. Papadopulos.

All of the various forms of ferrule described can be attached other than by compression jointing to the connector rod; for example they can be bolted to the ends of the rod, or they can be formed integrally with the ends of the rod so that the connector becomes an integral double-ended ferrule.

Instead of directly mounting the central body on the connector rod as described by way of example with reference to the drawings, it can be indirectly mounted, for example on an intermediate insulating ring. The use of such an intermediate ring is the subject of co-pending U.S. patent application Ser. No. 640,576, filed May 23, 1967, of A. S. Gahir.

Principal advantages of the joint structure in accordance with the present invention are that it provides independent passages on each side of the barrier through which the dielectric fluid can pass freely at a high rate of flow into and from the conductors of the cable and that it enables large pre-cast bodies having low thermal resistance to be used.

Another advantage of the joint structure is that metal fluid feed pipes connected to the inner parts of the joint enclosure are electrically isolated from the remaining parts of the joint enclosure and hence from the cable sheaths. This facilitates making connections and also facilitates direct cooling of this part of the joint structure by water jackets.

What we claim as our invention is:

1. In a stop joint structure between two lengths of sheathed fluid-filled cable comprising
   (a) a fluid-tight enclosure sealed to the sheaths of the cable lengths connected at the stop joint,
   (b) a barrier to the flow of the dielectric fluid from one cable length to the other comprising
       (i) a connector for both electrically and mechanically connecting the conductors of the two cable lengths, and
       (ii) a central preformed body of insulating material surrounding at least part of and sealed to the connector and to the fluid-tight enclosure, the provision of
   (c) two preformed end bodies of insulating material one surrounding each of the joints between the connector and a conductor of the two cable lengths connected at the stop-joint and each intercalated with one end of the central body, the intercalated bodies providing between them a sinuous path for the dielectric fluid leading from the region of the conductor joint at the end of the connector radially outwards to the outer part of the stop-joint enclosure.

2. A stop joint structure as claimed in claim 1 in which
   (a) the central preformed body of insulating material is formed with a peripheral flange,
   (b) the two preformed end bodies of insulating material are each formed with a peripheral flange,
   (c) the fluid-tight enclosure for the joint comprises
       (i) two end sleeves each adapted to extend between one of the sheaths of the cable lengths and one of the flanges on an end member, and
       (ii) two inner sleeves each extending between the flange on the central body and the flanges on one of the end bodies.

3. A stop joint structure as claimed in claim 2 in which the inner sleeves are supported by the flanges in such a way that they are spaced from the preformed bodies to provide annular oil chambers connected by the sinuous fluid paths to the inner part of joint structure.

4. A stop joint structure as claimed in claim 2 in which the inner sleeves are isolated by the flanges on the preformed insulating bodies from each other and from the end sleeves of the enclosure, which are electrically connected to the cable sheaths.

5. A stop joint structure as claimed in claim 1 in which an end face of each of the end bodies is formed with at least one concentrically projecting annular fin that fits with a small clearance into a deep annular groove in an end face of the central body, said clearance forming part of the sinuous path for the dielectric fluid.

6. A stop joint structure as claimed in claim 1 in which each end face of the central body is formed with at least one concentrically projecting annular fin that fits with a small clearance into a deep annular groove in an end face of one of the end bodies, said clearance forming part of the sinuous path for the dielectric fluid.

7. A stop joint structure as claimed in claim 1 in which the connector is a rod carrying at each end a ferrule adapted to be jointed to the conductor of one of the two cable lengths.

8. A stop joint or structure as claimed in claim 7 in which the connector rod is embedded in the central body in such a way that there is surface adhesion between the rod and the body.

9. A stop joint structure as claimed in claim 7 for cables with hollow conductors in which each ferrule is formed with a number of radial passages interconnecting the duct of the hollow conductor with an annular space surrounding at least part of the ferrule, the passages being so disposed that the fluid is deflected through an angle less than 90° when flowing from the hollow conductor into the annular space and vice versa.

10. A stop joint structure as claimed in claim 1 in which the central and end bodies are each vacuum cast from a synthetic resin.

11. A stop joint structure as claimed in claim 10 in which the resin is an epoxy resin.

12. A stop joint structure as claimed in claim 1 in which each of the end bodies is so shaped as to provide an annular oil chamber connected to the sinuous path for dielectric fluid and surrounding the part of the connector from or into which the fluid can flow.

13. A stop joint structure as claimed in claim 12 in which each end body incorporates a conductor screen for at least a part of said annular chamber.

14. A stop joint structure as claimed in claim 13 in which the conductor screen is in the form of a conductive layer applied to a recess in the bore of the end body forming the outer wall of said annular chamber.

15. A fluid-filled cable installation comprising at least two sheathed cable lengths connected end to end by a stop joint and in which the cable is cooled by circulating dielectric fluid through the hollow conductor of the cable and through external cooling means, the fluid leaving and reentering the cable at the stop joint, wherein the stop joint comprises
   (a) a fluid-tight enclosure sealed to the sheaths of the cable lengths connected at the stop joint,
   (b) a barrier to the flow of the dielectric fluid from one cable length to the other comprising
       (i) a connector for both electrically and mechanically connecting the conductors of the two cable lengths and
       (ii) a central preformed body of insulating material surrounding at least part of and sealed to the connector and to the fluid-tight enclosure, the provision of
   (c) two preformed end bodies of insulating material one surrounding each of the joints between the connector and a conductor of the two cable lengths connected at the stop joint and each intercalated with one end of the central body, the intercalated bodies providing between them a sinuous path for the dielectric fluid leading from the region of the conductor joint at the end of the connector radially outwards to the outer part of the stop joint enclosure, and
   (d) means for feeding the cooling fluid into and out of the stop joint enclosure in communication with each of said outer parts of the enclosure.

16. An installation as claimed in claim 15, in which in each stop joint:
   (a) the central preformed body of insulating material is formed with a peripheral flange,
   (b) the two preformed end bodies of insulating material are each formed with a peripheral flange,
   (c) the fluid-tight enclosure for the joint comprises
       (i) two end sleeves each adapted to extend between one of the sheaths of the cable lengths and one of the flanges on an end member, and
       (ii) two inner sleeves each extending between the flange on the central body and the flanges on one of the end bodies, each provided with an inlet or outlet for the cooling fluid.

17. An installation as claimed in claim 16 in which the inner sleeves are supported by the flanges in such a way that they are spaced from the preformed bodies to provide annular oil chambers connected by the sinuous fluid paths to the inner part of the joint structure.

References Cited

UNITED STATES PATENTS 1,773,715  8/1930  Austin _____ 174—91

FOREIGN PATENTS 1,352,064  12/1963  France.

LEWIS H. MYERS, Primary Examiner.

A. T. GRIMLEY, Assistant Examiner.

U.S. Cl. X.R.

174—88, 91